United States Patent Office 3,502,915
Patented Mar. 24, 1970

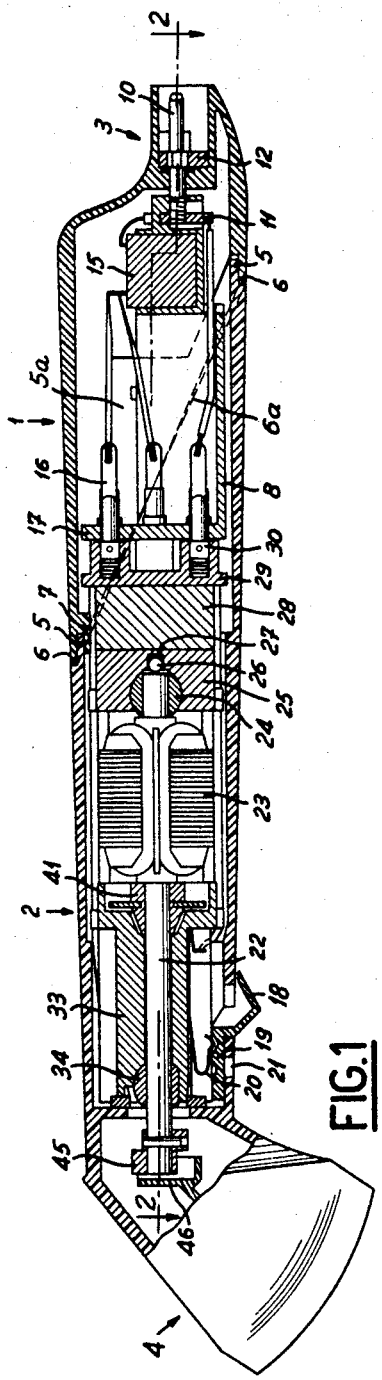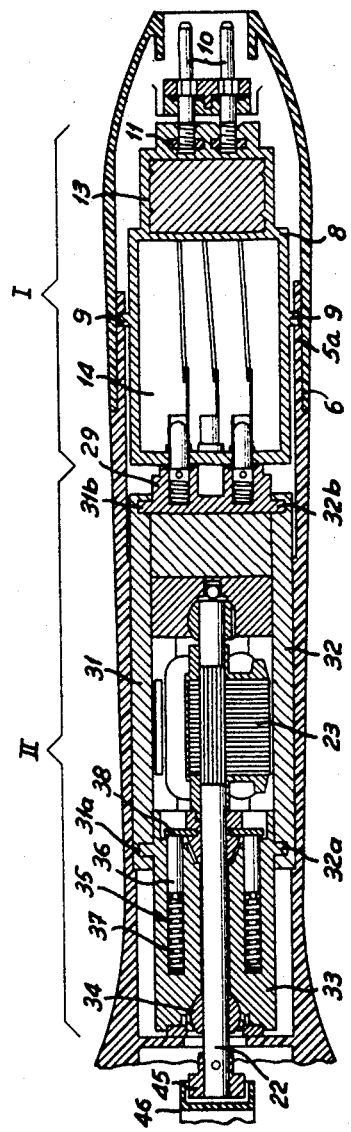
FIG.1
FIG.2
INVENTORS
MICHEL A. MORET &
CLAUDE R. ROSSET

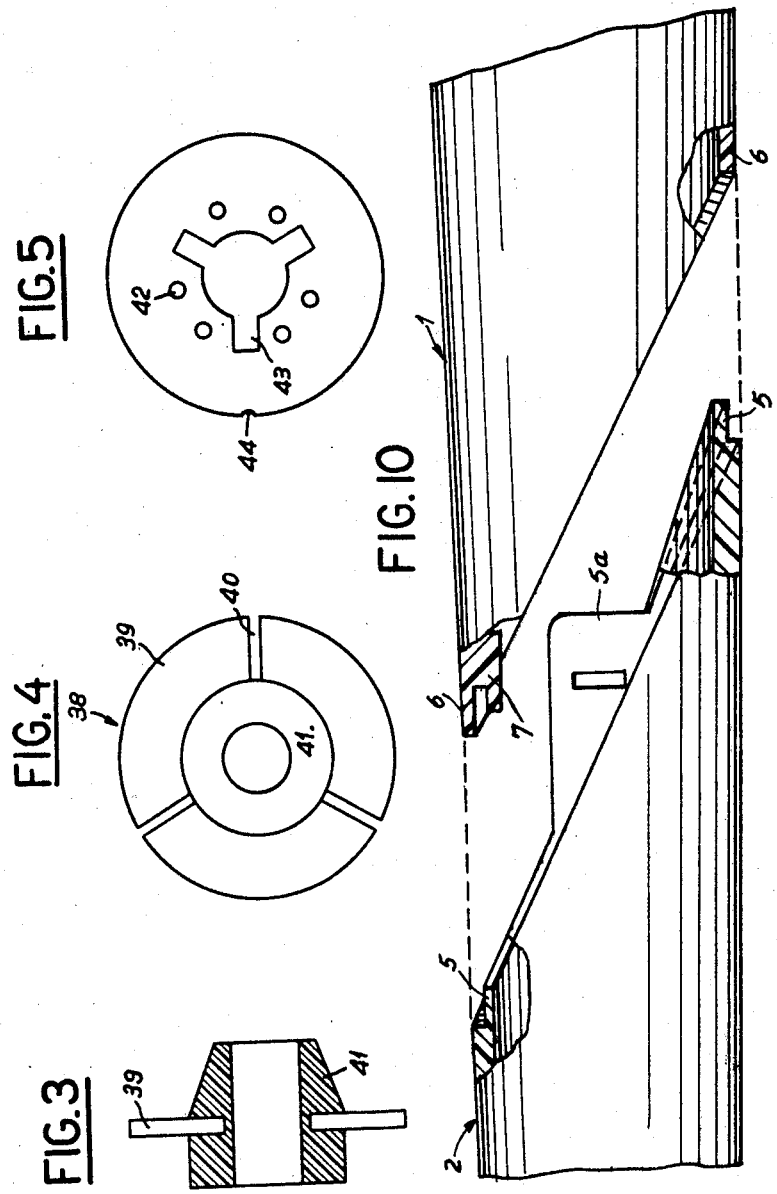

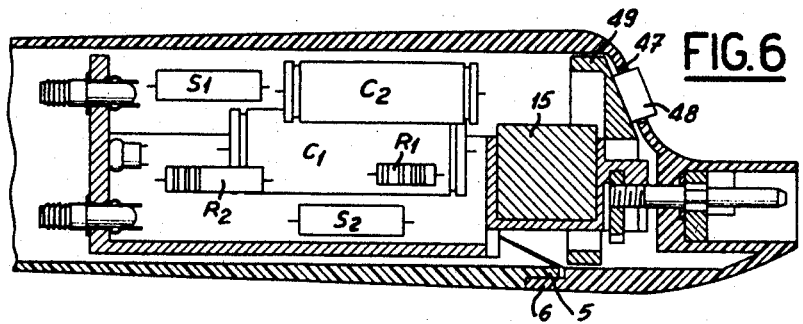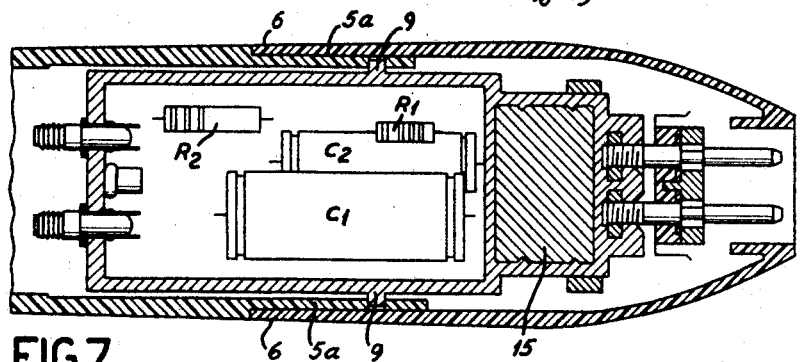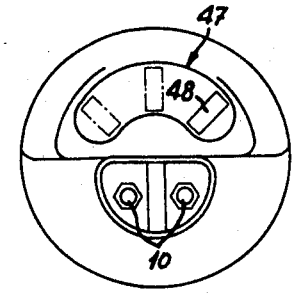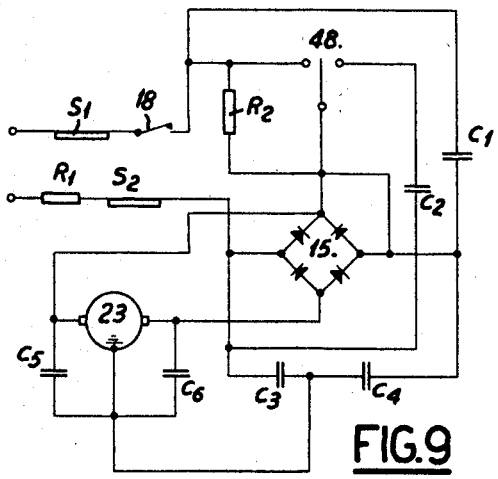

3,502,915
ELECTRIC DRY SHAVER WITH SLOPING LAP JOINT CONNECTING FRONT AND REAR CASING SECTIONS
Michel A. Moret and Claude R. Rosset, Geneva, Switzerland, assignors to Etablissements AESUP, Vaduz, Liechtenstein, a firm of Liechtenstein
Filed Nov. 1, 1967, Ser. No. 679,873
Claims priority, application Switzerland, Nov. 2, 1966, 15,826/66
Int. Cl. H02k *7/14, 37/00, 11/00*
U.S. Cl. 310—47                    8 Claims

ABSTRACT OF THE DISCLOSURE

An electric dry shaver has a casing formed in two sections joined by a lap joint at a sloping angle to the length of the casing, say less than about 45°. An inner indented shoulder extends rearwardly from the front section and is overlapped by the rear section, and portions of the shoulder are enlarged to form a pair of ears. A tongue-and-groove connection is formed at the forward end of the sloping joint. Driving means is mounted in the front section and is retained in place by projections elastically engaging in openings in the ears. The rear section, after being placed in position, is secured to the driving means. Advantageously the driving means includes a motor unit and a separate cradle containing a rectifier unit, the cradle being plugged into the motor unit and retained in place by the ears.

SUMMARY OF THE INVENTION

The present invention has for its object the provision of an electric dry shaver or razor which permits very convenient assembly by a relatively unskilled person without the need for special tools.

In accordance with the invention, an elongated casing forms a handle with a cutting head at the front end thereof. Driving means including an electric motor coupled to drive the cutting head and electrical means for supplying power to the motor are mounted within the casing. The casing is formed in two sections with a lap joint between the sections extending at an acute angle relative to the length of the casing with the front and rear ends of the joint separated a substantial distance lengthwise of the casing. An angle less than about 45° is specifically employed.

The lap joint includes an inner indented shoulder extending rearwardly of the front casing section which is overlapped by the rear casing section. An inner projection on the rear casing section at the forward end thereof is grooved to receive the adjacent portion of the shoulder to form a tongue-and-groove joint. The shoulder is enlarged on opposite sides of the front casing section rearward of the front end of the joint to form a pair of ears. The driving means is inserted into the front casing section from the rear thereof. The ears and the driving means have cooperating elastically engaging openings and projections which retain the driving means in place in the front casing section upon insertion thereof. Means are provided for securing the rear casing section to the driving means to prevent lengthwise movement thereof.

Advantageously the driving means includes a motor unit coupled to drive the cutting head which is initially inserted into the front casing section, and a separate cradle containing a rectifier unit for converting A-C from the power mains to D-C for the motor. The cradle is plugged into the motor unit by means of a pin-and-socket connection and has projections thereon which engage openings in the ears of the front casing section. The rear casing section is then secured to the rear end of the cradle, as by threaded prongs which pass through holes in the rear casing section and screw into threaded holes in the cradle. This construction permits the rectifier unit in the cradle to be separately tested if desired. Also, interchangeable cradles may be employed for different power line voltages. If desired, the power supply may be adapted to be used with different line voltages and a switch mounted on the rear casing unit for actuation by the user.

The accompanying drawing represents by way of example one embodiment of the object of the present invention:

FIGURE 1 is a longitudinal cross-section thereof.
FIGURE 2 is a cross-section taken along line 2—2 of FIGURE 1.
FIGURES 3 to 5 are views which show the collector of the motor.
FIGURES 6 and 7 are fragmentary views corresponding to FIGURES 1 and 2 for a modification.
FIGURE 8 is a right-end view of FIGURE 6.
FIGURE 9 is a circuit diagram of the elements of FIGURES 6 and 7.
FIGURE 10 is a detail showing the joint between the two casing sections.

The razor shown in the drawing comprises a casing having two parts 1 and 2. Part 1 is slightly tapered when the razor is viewed from the top (FIGURE 2) while its extremity forms a beak 3 when seen from the side (FIGURE 1). Part 2 is a tubular body having at one end a casing 4, made integrally therewith, in which is housed a cutting had not shown in the drawing.

The end of casing section 2 facing casing section 1 is provided with an inner indented shoulder 5 extending rearwardly of the front casing section 2 which is overlapped by end 6 of the rear casing section 1 to form a lap joint. An inward projection 7 at the forward end of the rear casing section is grooved to receive the adjacent portion of shoulder 5 to form a tongue-and-groove joint. It should be noted that the parts of casing section 1 and of casing section 2 which are in contact form a lap joint which cuts the longitudinal axis of the razor along a relatively acute angle less than 45°, as can be seen by considering dotted lines 6a showing the two edges of end 6 (FIGURE 1).

Referring to FIG. 10, adjacent portions of casing sections 1 and 2 are slightly separated to show more clearly the joint construction. Shoulder 5 is enlarged to form an ear 5a on one side of the front casing section 2 rearward of the front end of the joint. A similar ear is formed on the opposite side of the casing, as illustrated in FIG. 2.

The elements housed in the described casing are grouped in two distinct blocks. Block I comprises different electrical elements which permit the feeding of the motor with continuous current from alternating supply voltages which can differ. Block II comprises the motor and the coupling elements for the movable parts of the cutting head.

Block I is composed of a cradle 8 of insulating material, provided with two diametrically opposed projections 9 which engage elastically in the corresponding openings of shoulder 5 which is particularly large at this place to form ears 5a.

Cradle 8 is secured in beak 3 which has a socket in which project two male prongs 10 intended to be connected to the power line. These prongs 10 pass through the bottom of the socket through corresponding passages and screw into plates 11 mounted in corresponding slots provided in the rear of cradle 8.

In their middle, prongs 10 are hexagonally facetted so as to permit their tightening in plates 11 by means of a tubular key, for example. Prongs 10 thus not only serve as a connection for the razor to an electric cord (not shown) but make possible additionally the fastening of rear section 1 in place, since cradle 8 with which they are attached is in its turn secured to casing section 2 by the engagement of projections 9 and the openings in ears 5a.

Prongs 10 permit additionally to mount in the opening of beak 3 a protective plate 12, made of insulating material, which surrounds completely the facetted part of the prongs thus preventing operators from unscrewing them and opening the casing.

Cradle 8 has two compartments 13 and 14. The first is parallellipipedal and contains rectifier 15, for example a selenium rectifier. The second 14 is longer and is intended to receive, in the modification shown in FIGURES 6 and 9, the resistances, capacities and inductances which are necessary when the razor is intended to operate under different voltages. This housing 14 contains also four female prongs 16 riveted in four openings pierced in the elliptical disc 17 which limits movement of cradle 8 towards the left. Two of these prongs are used for feeding the motor with continuous current while the others lead the alternating feed voltage to the terminals of the control switch 18, positioned near the cutting head.

This switch 18 is constituted by a slide disposed in a corresponding opening of casing 2 which permits to move longitudinally a plate 19, the inner face of which has two transversal nicks, one of which is coated with a conductive barrette permitting to link, according to the position of the slide 18, two elastic contact blades 20 connected to the alternating feed voltage of the rectifier. The outer face of plate 18 has an indication (background or trait in colour, indication "on" or "off") which appears in a cut out 21 of casing 2.

The motor block II is constructed in a particularly simple and effective way. It is constituted by a shaft 22 of which is mounted a tripolar coiled rotor 23 in the embodiment shown. This shaft 22 engaged by its right hand end in a bearing 24 the outer face of which is spherical and which is secured in a corresponding seat of a support 25 made of plastic material. In the bottom of this support is additionally provided a cylindrical section in which is housed a ball 26 resting on a plate 27 intended to absorb the axial push of shaft 22. The contact between ball 26 and shaft 22 is continuous. Support 25, the lateral face of which is cylindrical, bears by its right hand surface against one of the two planar surfaces of a cylindrical permanent magnet 28 the other planar surface of which bears against the base 29 of insulating material in which are secured the male prongs 30 which correspond to the female prongs 16 and form pin-and-socket connections between the motor block and cradle 8.

The magnetic flux of magnet 28 is directed towards rotor 23 through two pole pieces 31 and 32 made of magnetic material and extending on both sides of this rotor, the cross section of which resembles a sector of a crown and the outer surface of which is cylindrical and of a diameter corresponding substantially to that of support 25 and magnet 28. At each of their extremities these pole pieces have transverse groves 31a and 31b, 32a and 32b respectively, by means of which it is possible to proceed to the assembly of block II grouping the motor and its accessories by simple encasement on small collars on base 29 and on cylindrical part 33 also of insulating material.

This part 33 in which are secured spring blades 20, has also a central opening for shaft 22, a bearing 34 having an outer spherical shape and in which is pivoted shaft 22, and two recesses 35 parallel to shaft 22 in which are placed commutation brushes 36 subjected to the action of springs 37 and in contact with the surface of the commutator 38 affixed to shaft 22.

Commutator 38 (FIGURES 3 to 5) is formed of three copper plates 39 separated by radial slots 40 and mounted on an insulating socket 41 forming a fastening core for commutator 38 on shaft 22. In order that the commutation and the wear of brushes 36 be absolutely uniform, it is important that plates 39 be in the same plane. To this effect commutator 38 is made in the following manner: a flat copper ring is provided with six holes 42 for the securing of plates 39, a central opening of which has three radial slots 43, and a positioning notch 44 on the outer edge (FIGURE 5). This ring is introduced in an injection mould having a shape corresponding to hub or core 41. After extraction from the mould, the ring is cut radially in extension of the three slots 43 in order to form slots 40 which isolate plates 39.

In order to ensure a correct axial positioning of rotor 23 inside pole pieces 31 and 32, between piece 33 and base 29, springs 37 are so dimensioned that brushes 36 exert on plates 39 of the commutator not only the pressure necessary to obtain a correct commutation but also such that the shaft 22 is pressed with a sufficient intensity on ball 26. As will be seen later, to this effort is added that exerted by the coupling device on shaft 22 to the cutting head, when the razor is in operation.

The free end of shaft 22 projects inside flared part 4 of the casing and has an eccentric circular cam 45 engaged between the wings of the lower end of a driving lever 46 partially shown, mounted in the block forming a support for the cutting head and the axis of symmetry of which makes an angle of 123 degrees with the axis of shaft 22. The outer surface of cam 45 is curved to avoid that there occurs a wedging of this cam between the wings of lever 46 arising from the component of force transverse to shaft 22 owing to the inclination of the head relative to casing 1, 2. Owing to this inclination, shaft 22 is subjected to an axial component of force in the direction of the driving motor of the razor which is added to the stress on this motor resulting from springs 37. Contact between cam 45 and lever 46 is practically continuous which occasions a particularly pronounced heating of said lever. To avoid localized melting or a flow of the plastic material forming the lever, the same is made in a particularly heat resistant material.

The modification illustrated in FIGURES 6 to 9 relates to a razor made so as to operate if need be under different voltages, in particular 110, 160 and 220 volts. Casing section 1 is cut out in its rear part by a window 47 through which projects a button 48 rigid with a ring 49 pivoted on a corresponding shoulder of cradle 8 and which forms the control member for a rectifier unit in cradle 8. A schematic circuit diagram of the rectifier unit is shown in FIG. 9 and includes inductances S1, S2, resistors R1, R2, capacitors C1–C6, rectifier bridge 15 and switch 18 for supplying direct current to rotor 23 of the motor. By moving switch 48 to different positions, different power line supply voltages may be accommodated. The design of the rectifier unit may follow conventional practice, and detailed description of its operation is unnecessary.

The different constructive features which have just been described result in that the razor according to the invention, except the two prongs, can be mounted on an assembly line without special tools, such as screw drivers or riveting machines, which offer the possibility of having the razor assembled by relatively unskilled persons. To this effect the different elements constituting the casing are so dimensioned as to be able to be slightly deformed manually to ensure the necessary fitting while guaranteeing a sufficient safety and solidity in operation.

Thus the motor unit may initially be assembled in the front casing section 2. The rectifier unit may be assembled in cradle 8 and separately tested if desired. Then the cradle is plugged into the motor unit via the pin-and-socket connection 16, 30 while at the same time slightly deforming either the center of the cradle or the ears 5a, or both, until the projections 9 engage in the openings in the ears. The assembly may be tested at this time, if desired. The rear casing section 1 may then be slipped over the cradle until it abuts the front casing section and prongs 10 are screwed into place. Protective plate 12 may then be attached. As will be understood, the lap joint at an angle to the length of the casing with the tongueand-groove connections 5, 6, 7 at its front end, forms a strong joint between the casing sections so long as the sections are held together. The latter is accomplished in a very simple manner by attaching prongs 10.

What is claimed is:

1. An electric dry shaver including an elongated casing forming a handle, a cutting head at the front end of said casing, and driving means within said casing including an electric motor coupled to drive said cutting head and electrical means for supplying power to said motor, in which the improvement comprises:

front and rear casing sections forming said elongated casing, a lap joint between said casing sections extending at an acute angle relative to the length of the casing with front and rear ends of the joint separated a substantial distance lengthwise of the casing, said lap joint including an inner indented shoulder extending rearwardly of said front casing section and overlapped by said rear casing section, an inward projection on said rear casing section at the forward end thereof grooved to receive the adjacent portion of said shoulder to form a tongue-and-groove joint, said shoulder being enlarged on opposite sides of the front casing section rearward of the front end of said joint to form a pair of ears, said driving means and front casing section being mutually dimensioned for insertion of the driving means from the rear of the casing section, said ears and driving means having cooperating elastically engaging openings and projections for retaining the driving means in place in the front casing section upon insertion thereof, and securing means for securing the rear casing section to said driving means.

2. An electric dry shaver in accordance with claim 1 in which said acute angle is less than about 45 degrees, said ears are elastic with openings therein and said driving means has projections thereon forming said elastically engaging openings and projections, said openings in the ears being located at least halfway from front to rear ends of said joint.

3. An electric dry shaver in accordance with claim 1 in which said electrical means is supplied from the power mains, and including a socket at the rear of said rear casing section and a pair of prongs therein for connection to a power line cord, said prongs being attachable through said rear casing section to said driving means to form said securing means.

4. An electric dry shaver in accordance with claim 3 in which said prongs are threadedly attached to said driving means, said prongs having shank sections which are enlarged for engagement with said rear casing section and are non-circular in cross-section, and a plate of insulating material mounted in said casing socket having holes through which said prongs project, said holes being shaped to fit said shank portions to prevent unscrewing thereof.

5. An electric dry shaver in accordance with claim 3 in which said driving means comprises a motor unit including said electric motor and a cradle on which said electrical means is mounted, and including pin and socket connections between said motor unit and said cradle, said cradle being positioned rearwardly of said motor unit and said prongs being attachable thereto, said cradle and said ears having said cooperating elastically engaging openings and projections.

6. An electric dry shaver in accordance with claim 5 in which the electric motor in said motor unit is a DC motor and the electrical means mounted on said cradle is a rectifier unit for converting AC from the power mains to DC for said motor.

7. An electric dry shaver in accordance with claim 6 in which said acute angle is less than about 45 degrees, said ears are elastic with openings therein and said cradle has projections thereon forming said elastically engaging openings and projections, said openings in the ears being located at least halfway from front to rear ends of said joint.

8. An electric dry shaver in accordance with claim 7 in which said prongs are threadedly attached to said cradle, said prongs having shank sections which are enlarged for engagement with said rear casing section and are non-circular in cross-section, and a plate of insulating material mounted in said casing socket having holes through which said prongs project, said holes being shaped to fit said shank portions to prevent unscrewing thereof.

References Cited

UNITED STATES PATENTS

| | | | |
|---|---|---|---|
| 2,158,145 | 5/1939 | Oster. | |
| 2,238,696 | 4/1941 | Hanley | 310—47 |
| 2,286,629 | 6/1942 | Kobler et al. | 310—47 |
| 2,999,952 | 9/1961 | Hammes | 310—154 |
| 3,014,144 | 12/1961 | Fleischmann et al. | 310—237 |
| 3,119,942 | 1/1964 | Luther | 310—50 |
| 3,153,737 | 10/1964 | Bey | 310—154 |
| 3,240,966 | 3/1966 | Thompson | 310—50 |
| 3,244,917 | 4/1966 | Gute | 310—154 |
| 3,315,356 | 4/1967 | Swanke et al. | |
| 3,373,301 | 3/1968 | Black | 310—72 |

WARREN E. RAY, Primary Examiner

U.S. Cl. X.R.

310—50, 68, 71, 73, 89, 90, 154, 237